United States Patent [19]

Frolow

[11] Patent Number: 5,796,005
[45] Date of Patent: Aug. 18, 1998

[54] FLEX METER FOR SPORTS GAME IMPLEMENTS

[76] Inventor: Jack L. Frolow, 448 Dewey St., Long Branch, N.J. 07740

[21] Appl. No.: 161,975

[22] Filed: Dec. 6, 1993

Related U.S. Application Data

[63] Continuation-in-part of Ser. No. 714,220, Jun. 12, 1991, abandoned.

[51] Int. Cl.⁶ ................................................ G01H 13/00
[52] U.S. Cl. .......................... 73/651; 73/579; 200/61.51; 473/461
[58] Field of Search ................ 73/651, 579, 862.41, 73/12.01, 12.04, 65.03, 862.43, 514.26, 514, 35, 514.36, 493; 273/72 R, 73 R, 77 A, 80 B; 200/61.51, 61.45 R; 340/683; 473/223, 461

[56] References Cited

U.S. PATENT DOCUMENTS

| | | | |
|---|---|---|---|
| 2,219,803 | 10/1940 | Bourne | 73/651 |
| 2,496,295 | 2/1950 | Langer | 73/651 |
| 2,900,817 | 8/1959 | Grindle et al. | 73/651 |
| 3,007,111 | 10/1961 | Umile et al. | 73/579 |
| 3,889,525 | 6/1975 | Bailey | 73/579 |
| 4,279,159 | 7/1981 | Powell et al. | 73/651 |
| 4,291,574 | 9/1981 | Frolow | 273/73 H |
| 4,599,898 | 7/1986 | Beer | 73/579 |
| 4,928,965 | 5/1990 | Yamaguchi et al. | 273/72 R |
| 5,001,933 | 3/1991 | Brand | 73/651 |
| 5,007,294 | 4/1991 | Matjasic | 73/862.41 |
| 5,022,651 | 6/1991 | Barone | 273/73 R |
| 5,040,279 | 8/1991 | Braly | 73/579 |
| 5,060,524 | 10/1991 | Artola | 73/651 |

FOREIGN PATENT DOCUMENTS

89/03709  5/1989  WIPO ................... 73/862.41

*Primary Examiner*—John E. Chapman

[57] ABSTRACT

A combination of an implement employed in a sports game to impact with a body, and a device coupled to the implement which measures the natural frequency and the relative amplitude of vibration of the implement resulting from the impact. The implement can be a game racket, bat, club or the like and the body impacted can be a ball. The lower the value of the natural frequency of vibration of the implement the more flexible the implement is when it impacts the ball, the greater is the amplitude of the vibration of the implement and the rebound of the ball has a lower velocity. One of the embodiments, called a FLEX METER is a frequency measuring device which employs a series of reeds mounted on a base member each reed being adjusted to vibrate at a maximum amplitude when a vibration having a designated frequency is applied to the base member. Each reed is identified with a designated frequency. A light emitting diode associated with each reed emits light when a reed responsive to the vibration of the implement has an amplitude sufficient to make an electrical connection to a closely positioned contact. The devices are all small in weight, size and are portable and convenient to use with the implement.

26 Claims, 6 Drawing Sheets

FLEX METER FOR SPORTS GAME IMPLEMENTS

This is a Continuation-in-part application of Ser. No. 07/714,220 filed Jun. 12, 1991, now abandoned.

BACKGROUND OF THE INVENTION

1. Field of the Invention

This invention relates to a combination of an implement, employed in a sports game to impact a body, and a device coupled to the implement which is capable of measuring the natural frequency and the relative amplitude of vibration of the implement resulting from the impact. The implement can be a tennis racket, bat, club, or the like; and the body impacted can be a ball or the like.

The lower the value of the natural frequency of vibration of the implement, the more flexible the implement is when it impacts the ball, and the greater is the amplitude of vibration of the implement; and the rebound of the ball has a lower velocity. The U.S. Pat. Re 31,419 to Frolow issued Oct. 10, 1983 in column 10, lines 46 states "The more flexible a racket is, the lower the frequency of vibration will be, and also the greater the amplitude of the vibration will be." In this patent Frolow designs a racket to have a very high natural frequency of vibration. This frequency is measured subsequent to the impact by attaching a sensor to the racket frame which generates electrical voltages which are amplified and fed to an oscilliscope wherein it is compared by means of Lissajous figures to an adjustable sinusoidal electrical voltage having a known frequency and amplitude. This method is accurate but the equipment required is large, not portable, and is suitable for use in a laboratory. The present invention utilizes devices which are very small, portable and allows the frequency to be measured easily when the implement such as a racket is held under specified mechanical conditions, and also when the racket handle is held by the player's hand as he would while in play.

It is known that when a tennis ball impacts a tennis racket at various locations along the longitudinal axis of the racket, the racket vibrates most when the ball impacts the head end of the racket, and it vibrates less as the location of the impact moves toward the center of the strung face. A location is reached wherein there is a minimal vibration and the velocity of the rebounding ball is greater, and as the location of the impact moves toward the throat portion of the strung face the vibration increases again. It is also noticed that the more flexible a racket is the greater is the amplitude of the vibration, and the lesser is the velocity of the rebounding ball at these locations of greater vibration.

A simple test procedure which illustrates the above statement is as follows:

(1) The player holds the racket in his playing hand as he would do during play.
(2) In the player's other hand he employs a rubber hammer weighing about a pound.
(3) The player strikes the racket with the hammer at a location close to the head end, and he notes the strength of the vibrations that he feels in his playing hand, and he also notes after the impact the magnitude of the rebound velocity of the rubber hammer held in the other hand.
(4) The player repeats steps (1) to (3) at several locations along the longitudinal axis of the racket toward the center of the strung face and thence toward the throat portion of the racket.

The player will notice that the vibration is greatest when the impact location is at the head end of the racket and it is also great in the vicinity of the throat portion; and it is a minimum in the vicinity of the central or upper central portion of the strung face. The location wherein there is a minimal vibration is known as a nodal point. The player will also note that the rebound velocity of the rubber hammer is greater at the nodal position; and it is less at the head end and throat portions, with the rebound velocity at the head end being less than that at the throat portion. The player will also notice as he tests various rackets, that when the natural frequency of vibration is lower, the greater is the variation in the amplitude of vibration of the racket and also the variation in the rebound velocity of the rubber hammer; and as the natual frequency of the racket becomes higher the variation in the rebound velocity and vibration are lessened.

The means utilized to measure the natural frequency of vibration in the present invention in several emodiments employs a series of mechanical reeds having one end mounted in a base member and each reed is tuned to a designated frequency. The devices are small and of light weight, and require no power sources. The devices are designed to have a light weight so as to minimize a change in the natural frequency of vibration of the implement, and to have the amplitude of the vibration of the reed be easily seen by the observer. In some embodiments of this invention to further distinguish the reed having sufficient amplitude of vibration responsive to coupling the device to the vibration of the implement to be measured from reeds which do not, a conductive contact is placed at a position close to the reed and when the vibrating reed has sufficient amplitude to make an electrical connection with the conductive contact a light emitting diode is activated. The initial position of the contact is not adjusted or changed when the device is employed from one racket or implement to another. The reed must have the proper diameter at the base member and the extended length from the base member must not only provide for the designated frequency of vibration, but also provide for a mechanical impedance which optimizes the reception of energy from the relatively small amplitude of vibration of the implement. Further, the vibrations of the implement are of a transient nature, they do not persist for a long period of time, and therefore the measuring device must respond quickly enough to receive the energy required to provide for an adequate amplitude of vibration of the resonating reed. Further the energy required by the frequency measuring device should be kept to a minimum, so as to not change the natural frequency of vibration of the implement.

2. Description of the Prior Art

There have been several U.S. patents issued for devices which measure the frequency of vibration such as: Apparatus for Measuring the Revolutions of Rotating Shafts to H. Frahm U.S. Pat. No. 759,513 issued May 10, 1904; Speed Indicator issued to H. L. Burkhardt U.S. Pat. No. 2,511,694, Jun. 13, 1950; and Vibration Measuring Devices issued to A. G. Gifford U.S. Pat. No. 2,543,573, Feb 27, 1951. These inventions are used to measure the frequency of any rotating body or vibrating body. They are not combined with a particular structure to provide a new and useful result, such as disclosed in the U.S. patent issued to D. A. Armstrong Aug. 25, 1953, U.S. Pat. No. 2,649,848 for a Speed Indicating Device for Outboard Motors; or the U.S. patent issued to McNamee Aug. 16, 1977, U.S. Pat. No. 4,041,775 for a Vibrometer. The patent to Armstrong provides for a combination which includes an outboard motor and a simple device for measuring the number of revolutions per minute of the motor and propellor; and the patent to McNamee provided for a combination of a helicopter and a vibration fequency measuring device, for determining the malfunction of various rotating members of the helicopter.

A U.S. Pat. No. 3,941,380 issued to LaCoste Mar 2, 1978 provides a weight means attached to the handle end of the racket. The weight means having a position restoring resiliency was designed to vibrate in resonance with the vibration induced in the racket, after a ball impacted the racket. The weight means system absorbed the vibration energy having the natural frequency of vibration of the racket. LaCoste does not disclose any information regarding the significance of the numerical value of the natural frequency of vibration of the racket to the playing performance of the racket such as the rebound velocity of the ball after impact and the magnitude of the vibration after the impact of the ball.

A U.S. patent issued to Takatsuka et al for a Vibration Absorber for a Racket Mar. 14, 1989, U.S. Pat. No. 4,811,947 discloses a device which is selectively tuned to the natural frequency of vibration of the racket, for the purpose of absorbing a maximum amount of vibrational energy from the racket and thereby dampen the vibration. No information is disclosed for measuring the value of the natural frequency of vibration of the racket nor its. significance with regard to the playing performance of the racket such as the rebound velocity of the ball, nor the magnitude of vibration subsequent to the impact of the ball.

U.S. Pat. No. 2,496,295 issued Feb 7, 1950 to Langer for a Vibration Spectrometer discloses polished steel balls on the ends of the vibrating reeds which reflect light and they are therefore more easily observed.

U.S. Pat. No. 3,333,278 issued Jul. 25, 1967 to R. D. Hawkins et. al. for a Method of Making a Frequency Responsive Device discloses a method for making a fiber optic element which can be utilized as a responsive vibrating reed and have its end transmit light to be more easily observed.

U.S. Pat. No. 3,310,978 issued Mar. 28, 1967 to A. J. Davis for a Fiber Optic Transducer and Analyzer discloses a light source feeding light to the fixed ends of fiber optic cantilever elements as responsive vibrating reeds, to provide more visible observation of the responsive vibration.

The patents to Langer, Hawkins and Davis illustrate the need to make the responsive vibrating elements more discernible by means of reflected or transmitted light.

Recently light emitting diodes LED's which are very small, very bright, of various colors, require little energy have become available. Further these LED's respond very quickly to an applied voltage as low as 3.0 volts direct current. Thus the application of LED's to the vibrometers as disclosed in this application has become practical. The prior art has not disclosed these LED's to be utilized as shown in this application. The devices shown in FIGS. 20 and 22 of this application utilize LED's to indicate the reed elements having sufficient amplitude of vibration responsive to the driving vibration of the implement to be measured.

U.S. Pat. No. 5,080,362 dated Jan. 14, 1992 to Lillard for an Adjustable Point of Impact Indicating Device discloses an impact sensing device attached to a sporting implement to provide a visual indication when the implement strikes a sporting object comprising a flexible wire encircled by contacts. Upon impact between the sporting element and the sporting object the wire oscillates to connect to the encircling adjustable contacts. A circuit is closed and a light emitting diode indicator is activated by a power source. The sensitivity of the device is adjusted by changing the relationship between the wire and the contact.

This device is employed to indicate to the player the position of the sporting implement the instant that the implement impacts the ball. It is not employed to measure the natural frequency of vibratory flexing of the implement and thereby measure the vibratory flexing of the implement as is disclosed in this application.

Further, the patent to Lillard does not disclose or teach that the vibratory mechanical wire should have a known natural frequency of vibration which is substantially the same as the unknown natural frequency of the vibratory flexing of the implement to be measured and thereby obtain a sufficiently large amplitude of vibration of the wire element to make electrical connection to a contact having a fixed position close to said wire and activate a light associated with said wire, and thereby distinguish the said wire from the other adjacent wires not having a natural frequency of vibration substantially the same as the frequency of the flexing of the implement.

Further, Lillard does not disclose or teach that the sporting implement having an unknown natural frequency of vibration which is not substantially the same as the known natural frequency of the said wire does not and should not cause the said wire to oscillate with sufficient amplitude to make electrical connection to said contact and activate the light indicator associated with said wire.

SUMMARY OF THE INVENTION

The devices used to measure the natural frequency of vibration in this invention are combined with an implement employed in a sports game to impact a body, such as a racket and a ball or the like, to provide a means for comparing significant useful information concerning a racket performance during play in a game. Such information being the amplitude of the vibration the player receives in his hand holding the racket, and in magnitude of the rebound velocity of the ball after impact. The apparatus disclosed in the Frolow patent Re 31,419 reissued Oct. 18, 1983 to measure the frequency of vibration of the racket is relatively large and more suitable to be used in a laboratory. The frequency measuring devices disclosed in this specification are small, light in weight, convenient to use by any player or person who desires to compare the relative performance merits of various rackets available for use anywhere.

This invention provides for a combination of an implement, employed in a sportsgame to impact a body, such as a tennis racket and a ball, the implement having natural frequencies of vibration associated with modes of vibration resulting from the impact of the body; and a small light weight simple, convenient to use device, capable of measuring the natural frequencies of vibration; and the device being coupled to the natural frequencies of vibration of the implement.

The following objects of this invention are to demonstrate:

1. The relative flexibility of the implement during impact.
2. A lower value for $f_r$, the natural frequency of vibration of the implement indicates an increased flexing of the implement when the impact on the implement occurs in the vicinity of the distal end of the implement from the player's hand.
3. A lower value of $f_r$, for the natural frequency of vibration of the implement indicates an increased amplitude of vibration received by the player's hand when the impact on the implement occurs in the vicinity of the distal end of the implement from the player's hand.

4. A lower value of $f_r$ for the natural frequency of vibration of the implement indicates a decreased rebound velocity of the body impacted by the implement when the impact on the implement occurs in the vicinity of the distal end of the implement from the player's hand.

5. The value of $f_r$ for the natural frequency of vibration of the implement, indicates the mode of vibration of the implement.

6. When the implement is a tennis racket or the like, the amplitude of vibration received by the player's hand:
   a. is greatest when the impact on the racket occurs on the distal end of the racket from the player's hand.
   b. decreases to a minimum value as the impact on the racket occurs at locations toward the center of the racket's strung face.
   c. increases again as the impact location occurs toward the throat portion of the strung face.

7. The location of the impact at which the minimal vibration occurs, this location being a nodal position for the associated mode of vibration, is easily determined.

8. The rebound velocity of the ball is greatest at the location of the nodal position 9. The variation in the amplitude of vibration received by the player's hand and the variation in the rebound velocity of the ball, these variations occuring as the impact location on the racket varies from the head end of the racket, through the center portion of the strung face, to the throat portion of the strung face, is minimized when the value of $f_r$ the natural frequency of vibration of the racket is higher.

10. The effective mass presented by the implement having a natural frequency of vibration $f_r$ to a force suddenly applied at a location on the implement for a short period of time, $t_1$, the effective mass designated as $M_e$ being defined hereinafter, is increased as the ratio of the time $t_1$ to the period of time required for one complete cycle of the natural frequency of vibration being $T_r$ equal to $1/f_r$, and the ratio being expressed as $t_1/T_r$.

11. The effective mass presented by the implement having a natural frequency of vibration $f_r$ to a force suddenly applied at a nodal location on the implement for a short period of time the effective mass designated as $M_e$ hereinafter defined, is greater at said nodal location than at locations other than said nodal location.

12. A further object of this invention provides a vibrometer for measuring the vibrating frequency of a vibrating body having a light indicating means for indicating the reed having sufficient amplitude of vibration responsive to the driving vibration of the vibrating body.

13. It is an object of this invention to measure the string netting plane spring constant of a game racket by utilizing the device disclosed in this invention to measure the frequency of vibration, having a known weight fastened to the center of the string netting, said weight being much larger than the weight of the string netting, responsive to an impact on the string netting.

DETAILED DESCRIPTION OF THE PREFERRED EMBODIMENTS

Figure 1:
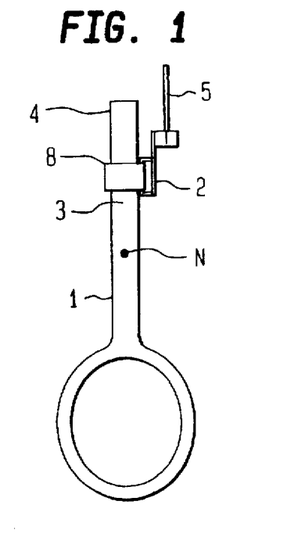
FIG. 1 shows a front view of an embodiment of the invention employing a device that indicates the frequency of vibration of a tennis racket which is coupled to the device.

FIG. 1 shows a tennis racket 1 in combination with a mechanical device 2 capable of measuring the natural frequency of vibration of the tennis racket 1. The vibration occurs as a response to a blow impacting the racket 1 at the head end, perpendicular to the strung face. The device 2 is coupled to the handle portion of the racket at a location 3 which may be shifted toward the nodal position N or toward the handle end 4. Positions closer to N on the handle have amplitudes of vibration which are smaller, but which are capable of exerting a greater vibratory force on the device 2.

Positions on the handle closer to the end of the racket handle have larger amplitudes of vibration, but are capable of exerting a smaller vibratory force on the device 2. The above consequences occur since the nodal position N is a position which does not move during the vibration and thus acts as a pivot point or a fulcrum as in a see-saw lever, and as in a see-saw, the force required to move the lever decreases the further the force is positoned from the pivot, but the distance through which the force must move is increased. The weight of the device 2 changes the natural frequency of vibration of the racket 1, which occurs when the device 2 is not attached to the racket. The device 2 is made to have a light weight in order to minimize this change in frequency. The wire reeds 5 have their diameters made larger, whereby for the same excursion of the base member 6, a greater force is needed to deflect the end of the reed. For a given designated frequency of vibration the larger the diameter of the reed requires a larger extended length of the wire reed, which is mounted as a cantilever to the base member 6. Thus the reed length, diameter, and the weight of the device 2 are designed to be mounted on the racket handle position which results in an excursion of the end of the vibrating reed which is easily seen by a person, and which allows the attachment of the device 2 to the racket to change the natural frequency of vibration of the racket a minimal amount. The tennis racket 1 can be any game racket or implement. The device 2 is shown again in more detail in FIG. 2. The device is labeled a FLEX METER, since it indirectly measures the amount the racket flexes during an impact with a ball. Other appropriate names may be selected. The amount the racket flexes during impact and subsequent to the impact plays an important role in determining the rebound velocity of the ball after the impact, and also the strength or amplitude of the vibration received by the player's hand. The device 2 has a base member 6 made of sheets of plexiglass which are cemented together with the appropriate solvent. The wire reeds 5 were sandwiched between two layers with the cement which dissolves the plexiglass and then solidifies. In the embodiment shown the reeds were round steel music wires having a diameter of 0.025 inches or 0.0635 cm and various lengths. After the plexiglass solidified a drop of glue was applied to the base of each wire. The length of each wire was adjusted to obtain a resonant frequency of vibration of the wire reed which matched the frequency calibration marking 10 on the base member 6. In the embodiment shown the markings ran from 100 cycles per second to 240 cycles per second. The calibration markings and reeds may be designed for other higher or lower frequencies. In the device shown in FIG. 2, the base 6 is approximately 5 cm wide, 1.11 cm deep and 9.53 cm high. The reed lengths vary approximately from 3.81 cm to 6.35 cm in length. The base member 6b is approximately 2.54 cm wide, 1.27 cm deep, and 1.91 cm high. The device weighs approximately 11 gms.

In operation the Flexmeter 2 is strapped on the racket to be rated in various manners. In the manner shown in FIG. 1 the reeds will vibrate in a direction parallel to the direction of the adjacent reeds which is also in the direction of the vibration and the direction of an applied force, which is perpendicular to the strung face. Motion of the resonant reed is more easily seen since the adjacent reeds do not vibrate as much and the relative motion with respect to these adjacent reeds is more easily observed. The ends of a number of reeds are colored and the calibration markings on the base member possess the same colors which allows for an easier association with the same colored reed.

Various positions and direction of vibration may be utilized in fastening the device 2 to the racket 1 for the purposes of analyzing the mode, amplitude, and frequency of the vibrations.

Figure 2:
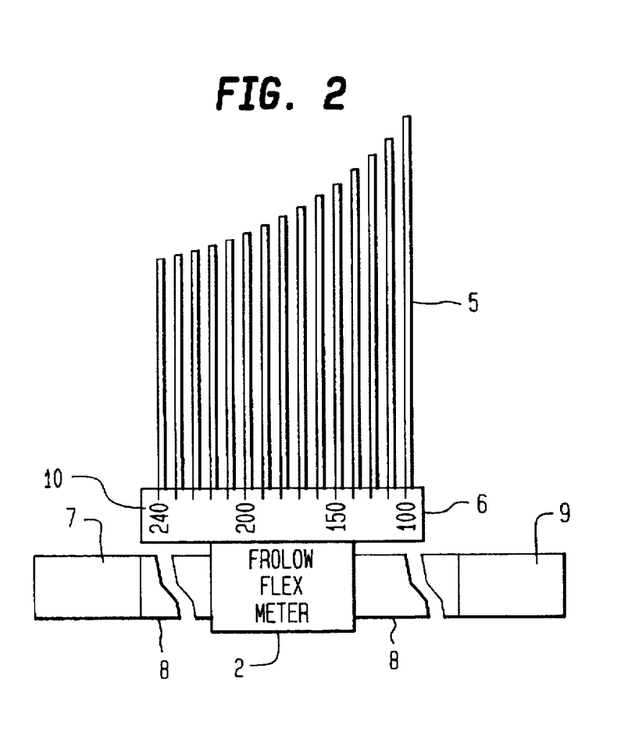
FIG. 2 shows a front view of the device shown in FIG. 1.
Figure 3:
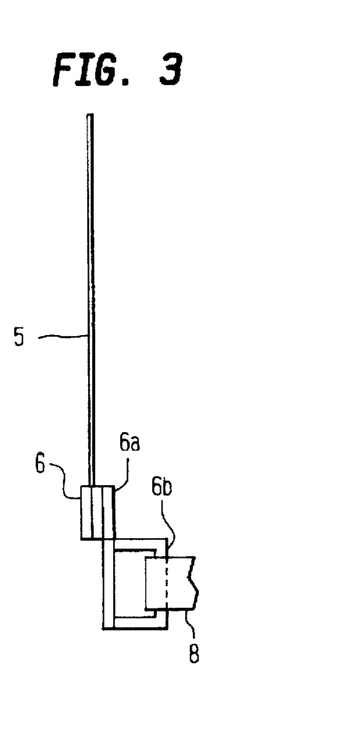
FIG. 3 shows a side view of FIG. 2.
Figure 4:
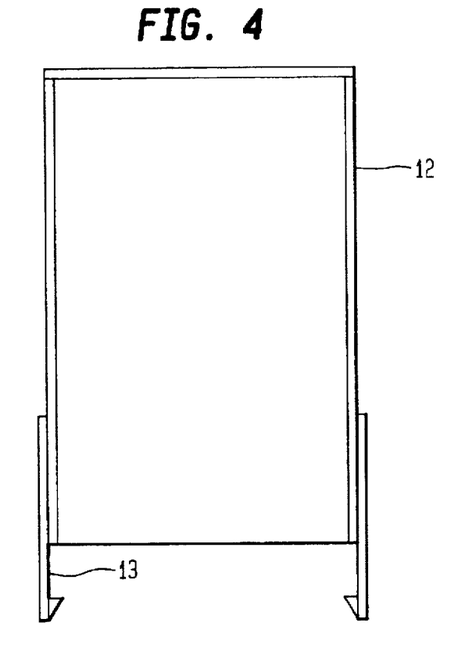
FIG. 4 shows a front view of a protective cover for the device shown in FIG. 3.
Figure 5:
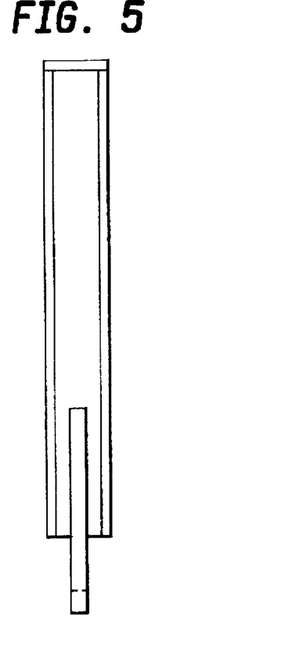
FIG. 5 shows a side view of FIG. 4.

The base member 6 has a portion 6b which is set off from the portions 6a, and portion 6b has an elastic band 8 cemented to the plexiglass member 6b. The elastic band 8 has a portion 9 which has a Velcro male portion and a portion 7 being a female portion. The elastic band is wrapped around the racket handle and fastened. The elastic band 8 presses the base member 6b against the racket handle, thereby providing for the racket vibrations to be transmitted to the base member 6 of the device 2.

EXPLANATION OF OPERATION

When the racket vibrates due to the impact, the vibrations are transmitted to the base member 6 which then causes the reeds 5 to vibrate. Those reeds which have resonant frequencies close to the frequency of vibration of the racket handle, vibrate with a larger amplitude and the calibration marking of a reed having the largest amplitude is read as the frequency of vibration of the racket. The device 2 must respond quickly to the vibrations of the racket handle, since these racket vibrations decrease rapidly being caused by a single impact of short time duration. Also the energy absorbed by the device 2, and the weight of the device 2 should be small so as to minimize the effect of changing the natural frequency of vibration of the racket. The length and diameter of the reeds 5 must be designed to maximize the transfer of energy from the racket 1 handle vibrations to the device 2 as to provide the amplitude of vibration of the wire reed 5 that can be easily seen. The amplitude of the vibration of the resonant reed 5 is an indication of the magnitude of the vibration of the racket 1, i.e., when the racket 1 vibrates with a greater amplitude, either because it was impacted with greater force or, being more flexible, it vibrates more for the same force, the resonant reed 5 will vibrate with a greater excursion. It is easily observed that for a given impact force, the amplitude of vibration of the resonant reed 5 is greater if the frequency of the vibration is lower. Also the diameter of the reeds 5 and their length must be selected to provide for adequate strength and durability, so that they will not be bent or distorted in handling and use.

RELATION OF VIBRATION FEQUENCY AND RACKET PERFORMANCE

When a ball impacts a racket at a location which causes the racket to vibrate, for example at the head end of the racket frame, the frame will bend during the impact. When the racket frame bends or flexes, it is an indication that the particles of the racket frame immediate to the impact location react to the impact more than the particles of the racket frame, which are distant from the impact location, do when the racket frame is rigid. Thus not all of the particles of the racket frame are being fully utilized in reacting to the impact. It is known that when a tennis ball impacts a heavier body it bounces back with a greater rebound velocity than when it impacts a lighter body. Thus when a ball hits the head end of a racket which bends, the ball interacts with a body which is not as effectively heavy as a racket which does not bend, and the ball rebounds with a lesser velocity.

Figure 18:
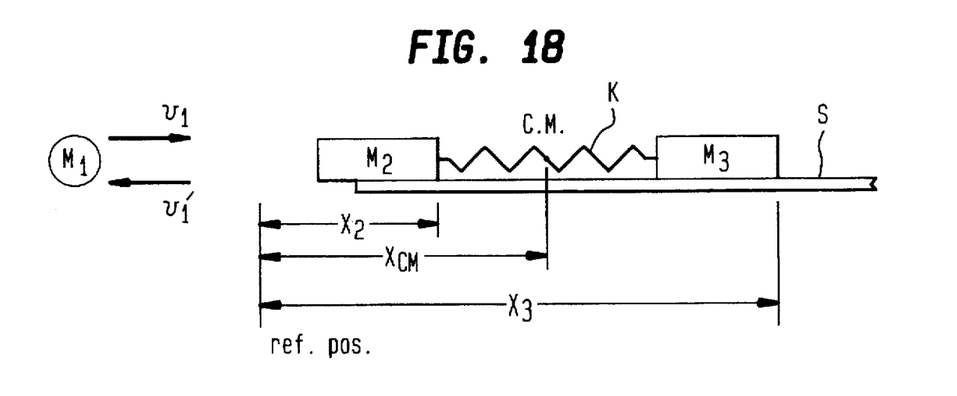
FIG. 18 shows schematic diagram of two masses, $M_2$ and $M_3$ connected by a spring K resting on a frictionless plane S, having a mass $M_1$ approaching mass $M_2$ with a velocity $v_1$.

To further explain the physical phenomena involved refer to FIG. 18 which shows a mass $M_1$ having a velocity $v_1$ approaching a mass $M_2$ and after the body $M_1$ impacts the mass $M_2$, it rebounds in the opposite direction with a velocity $v_1'$. These velocities are all relative to a fixed observer. The mass $M_2$ is connected to another mass $M_3$ by a spring K having a spring constant K. Both masses $M_2$ and $M_3$ are resting on a plane surface having no friction forces with the masses $M_2$ and $M_3$. The velocities $v_2$ and $v_3$ of $M_2$ and $M_3$ are zero prior to the impact of mass $M_1$, and the velocity of $M_2$ immediately subsequent to the impact is $v_2'$. $X_2$ and $X_3$ are the distances that the masses $M_2$ and $M_3$ move from a reference position, and the velocity $$v_2' = \dot{x}_2' = \frac{dx_2'}{dt}$$

When the mass $M_1$ impacts the mass $M_2$ the distance $X_2$ increases. If $X_2$ doesn't increase very much before the impact is over at the time $t_1$, not much force is applied to the mass $M_3$ through the spring K. This is especially so if the spring K is not very stiff. Therefore when the impact is of short duration and the spring K is soft, and the masses $M_2$ and $M_3$ are heavy, the impact interacts with an effective mass, $M_e = M_1$. When the spring K is very stiff, the duration of the impact $t_1$ is large, and the masses $M_2$ and $M_3$ small, the impact reacts with an effective mass of $M_e = (M_1 + M_2)$.

The motion of the masses $M_2$ and $M_3$ can be described as follows:

The system consisting of the masses $M_2$ and $M_3$ connected by the spring K has a center of mass defined by $$\bar{X}_{CM} = \frac{M_2 X_2 + M_3 X_3}{M_2 + M_3}$$

The impact causes the center of mass of the system $\bar{X}_{CM}$ as defined above to accelerate during the impact and at the end of the impact at time $t_1$, $\bar{X}_{CM}$ has attained a steady velocity of $\dot{\bar{X}}_{CM}$. The mass $M_2$ at the end of the impact has attained a velocity $\dot{X}_2$ which is greater than $\dot{\bar{X}}_{CM}$, and the mass $M_3$ has attained a velocity $\dot{X}_3$ which is less than $\dot{\bar{X}}_{CM}$. If an observer sits on the center of mass $\bar{X}_{CM}$ the two masses $M_2$ and $M_3$ move toward each other and compress the spring K and the force of the spring K causes the masses $M_2$ and $M_3$ to oscillate at the same frequency toward each other and the center of mass $X_{CM}$. The period of time it takes for the masses $M_2$ and $M_3$ to complete one oscillation is given by $$T_r = 2\pi \sqrt{\frac{K}{\frac{M_2 M_3}{M_2 + M_3}}} = \frac{1}{f_r}$$

An analysis shows that when the ratio of $t_1/T_r$ is small the effective mass $M_e = M_1$, and when the ratio $t_{1/T_r}$ is large the effective mass $M_e = (M_1 + M_2)$ The amplitude of the vibration of the mass $M_2$ with respect to the center of mass $\bar{X}_{CM}$ is given by $A_2$ and that of $M_3$ by $A_3$, and the following relation pertains $$M_2 A_2 = M_3 A_3$$

In the above system, if we allow $M_3$ to become very large, the system becomes a single mass $M_2$ oscillating with respect to the center of mass $\bar{X}_{CM}$ of the system, which is at $M_3$ the ground, or the observer.

The above analysis concerning $M_e$ still pertains and the system becomes more similar to a tennis racket being held by a player.

It is noted that the mass of a racket is not lumped at one location as $M_2$ is at $X_2$ but is distributed along the axial length, of the longitudinal axis similar to the mass distribution in a bar. Although the amplitude of the vibration of a bar that is struck varies along the length of the longitudinal axis of the bar all of the distributed mass of the bar vibrates at the same frequency for a particular mode of vibration.

The above simplified example provides an insight of the importance of obtaining a high value for the natural frequency of vibration for a racket, since it provides for a large value for the ratio of $$\frac{t_1}{T_r},$$

, and hence a larger effective mass $M_e$ to interact with the ball and thereby provide for a higher rebound velocity of the ball.

The effective mass $M_e$ at the point of the implement which is impacted is defined as the ratio of the change in the momentum of the impacting body $M_1$ divided by the velocity of the point on the implement which is impacted at the time $t_1$ immediately subsequent to the impact. $M_e$ is defined in the expression:

$$M_e = \frac{M_1(v_1 - v_1')}{v_2'} \tag{1}$$

Here $M_1$ is the mass of the impacting body $v_1$ is the velocity of $M_1$ just prior to impact $v_1'$ is the velocity of $M_1$ just subsequent to impact $v_2$ is the velocity of the point on the implement which is impacted just prior to impact and which is zero, for simplicity $v_2'$ is the velocity of the point on the implement which is impacted just subsequent to impact The rebound velocity of the impacting body $M_1$ is determined from the following expression in the case when $v_2$ is zero prior to impact, and the velocity of the impacting body $M_1$ is $v_1$ just prior to impact. The rebound velocity of $M_1$ just subsequent to impact is $v_1'$ since —e[velocity of approach]=[velocity of separation] Here e is defined as the coefficient of restitution and in the case wherein $v_2=0$ $$-ev_1 = v_1' - v_2' \tag{2}$$

substituting for $v_2'$ in equation (1) above, the value for $v_2'$ obtained from equation (2) we have $$v_1' = \frac{M_1 - eM_e}{M_1 + M_e} v_1$$

It is seen in this equation that as $M_e$ increases in value, $v_1'$ the rebound velocity increases.

The maximum value that $v_1'$ can attain is $-ev_1$.

DESCRIPTION OF OTHER EMBODIMENTS

Figures 6, 7, 8, 9, 13:
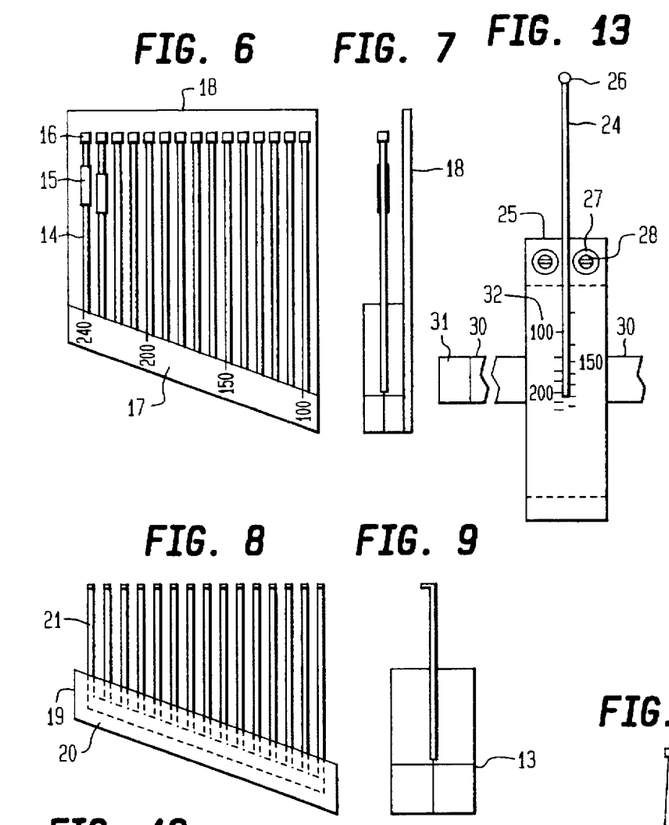
FIG. 6 shows a front view of another device for measuring the frequency of vibration.
FIG. 7 shows a side view of FIG. 6.
FIG. 8 shows a front view of another device for measuring the frequency of vibration.
FIG. 9 shows a side view of FIG. 8.
FIG. 13 shows a front view of another device for measuring the frequency of vibration.

In FIG. 6 and FIG. 7 are shown a front view and a side view of another device for measuring the frequency of vibration. The reeds 14 are embedded in a base member 17 as in the structure shown in FIG. 2. The reeds 14 are round steel music wire having a diameter of 0.020 inches or 0.0508 cm and are extended cantilever lengths which are in the range of approximately 2.54 cm to 6.35 cm. On the body of each wire reed 14 is a weight means 15 being a short piece of stranded wire encased in a colored plastic insulating sleeve. A few strands of the wire were removed to make space for the wire reed 14 and the weight means 15 is threaded thereon. Each wire reed 14 is tuned to its designated frequency by sliding the weight means 15 appropriately on the wire reed 14. The weight means 15 is fixed in its final position by a drop of glue.

The ends of the wire reeds 14 have a small colored weight means 16 attached. An opaque colored back plate 18 is attached to the base 17 by means of the plexiglass solvent glue for protection of the wire reeds 14 as well as providing a means for more easily observing the vibratory motion of the reeds 14 when it occurs. The device shown in FIG. 6 is aproximately 5.08 cm wide, 5.08 cm high, 1.27 cm deep and it weighs approx. 10 grams.

Figures 10, 11, 12:
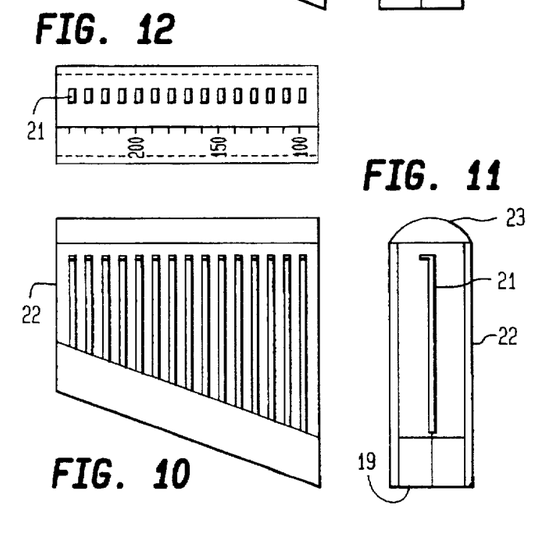
FIG. 10 shows the structure of FIG. 8 enclosed in a protective cover having a magnifying lens.
FIG. 11 shows a side view of FIG. 10.
FIG. 12 shows a top view of FIG. 10.

In FIG. 8 and FIG. 9 is shown another device for measuring the frequency of vibration. A base 19 is made of plexiglass, consisting of two sheets of approximately 0.64 cm thick and the planar shape shown. Sandwiched between these two sheets is a sheet of steel 20 which has been slotted to provide a series of flat reeds 21 which are cantilevers. The steel is 0.008 inches or 0.020 cm thick. The slotted sheet 20 can be punched out to provide for uniformity. Each reed 21 has an extended length and weight adjusted which provides for a designated frequency of vibration, which is identified and marked on the base 19 but is not shown in FIG. 8. FIG. 9 is a side view of FIG. 8 and it shows the ends of the reeds 21 being bent to improve their visibility. The ends of the reeds 21 are also colored to correspond to the frequency identifying marks not shown on the base member 19. These reeds 21 vibrate in a direction which is perpendicular to the plane of the sheet 20. The sheet 20 and the base member 19 may be made other suitable materials such as another metal or plastic. FIG. 10 and FIG. 11 show a front view and a side view of the structure shown in FIG. 9 which has been enclosed in a protective case 22. The top of the case 22 comprises a plastic magnifying lens 23 which enlarges the end view of the reed ends 21. FIG. 12 shows a top view of FIG. 10.

The approximate dimensions of the device shown in FIG. 11 and FIG. 12 are 5.08 cm wide, 3.96 cm high, by 1.59 cm deep and it weighs approximately 21.3 grams. These dimensions and weight can be further reduced. The limitation in size being the visibility of the ends of the reeds 21 while vibrating, and the fragility of the reeds 21. The lower the weight the less is the effect this frequency measuring device has in changing the natural frequency of vibration of the game implement to which it is coupled.

Figure 14:
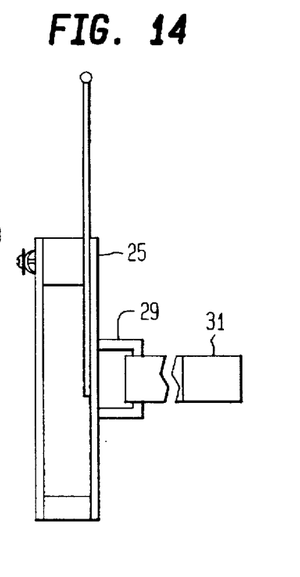
FIG. 14 shows a side view of FIG. 13.

FIG. 13 and FIG. 14 show a front view and a side view of another device for measuring the frequency of vibration. A single reed 24 is slideably mounted as a cantilever in a base member 25. The extended length of the reed 24 can be adjusted by appropriately pushing or pulling the wire reed 24. A plastic bead 26 is attached to the end of the wire 24 to prevent puncture of the user's hand, and to increase the visibility of the reed end. It is important that the base member 25 not allow any free play between the base member and the wire entering into the base member at the slideable mounting of the reed. The base member 25 is plexiglass and comprises essentially two strips about 6.35 cm long and 1.59 cm wide, and 0.159 cm thick joined as shown in FIG. 14. The groove for the wire reed was formed by placing a wire of appropriate size between two layers of the plexiglass before applying a plexiglass solvent to the sandwiched joining of the two strips. The layers become cemented together and the wire groove is formed subsequent to the solidification of the dissolved plexiglass and the removal of the wire forming the groove. A wire reed 24 having a slightly larger diameter than the groove is then employed. The slideable mounting can also be obtained by sandwiching the wire 24 between two layers of material which are not cemented together having a groove for the wire 24. The compression on the wire is obtained by the use of cupped spring washer 27 and a screw fastening 28, or by rivets not shown. The base member 25 has a protuberance 29 as shown and an elastic band 30 attached. The elastic band has cemented to its end portions a velcro fastener 31.

In operation the structure of FIG. 13 is attached to the game implement by placing the protuberance 29 against the racket handle and wrapping the elastic band 30 around the handle portion of the racket. The racket is impacted successively, and between impacts, the extended length of the wire reed 24 is adjusted appropriately to obtain the maximum amplitude of vibration of the wire reed. The base member 25 has markings 32 to indicate the frequency of vibration associated with each adjusted extended length of the reed. The bead 26 of the end of the reed is observed and when the maximum amplitude of vibratory motion occurs with the adjustment of the extended length of the reed 24, the marking 32 identifying the natural frequency of vibration is noted.

Figure 15:
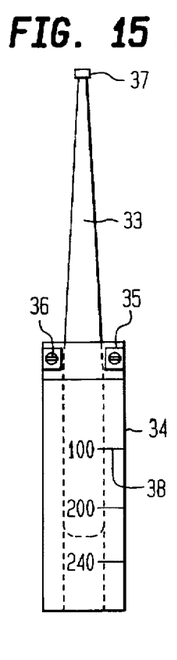
FIG. 15 shows a front view of another device for measuring the frequency of vibration.
Figure 16:
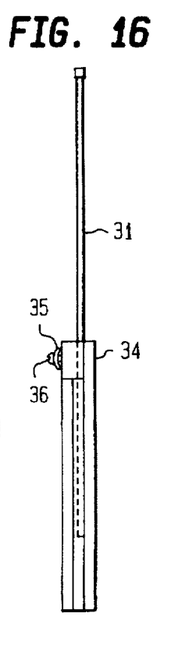
FIG. 16 shows a side view of FIG. 15.

FIG. 15 and FIG. 16 show a front view and a side view of another device for measuring the frequency of vibration. A reed 33 has an upper portion having a length extended from the base 34 shaped as substantially a triangle. Such a triangular shape provides for a greater excursion of the reed tip bead 37 during its vibratory motion when it occurs. The member 33 has a thickness of 0.025 inches or 0.635 cm and is made of steel. The reed 33 is slideably mounted on the base 34 as a cantilever, wherein the extended length can be adjusted by pulling or pushing the reed 33. It is important that there be no significant free play between the reed 33 and the base 34 at the location of the mounting base, therefore the member 33 is fastened to the base 34 by means of a pressure washer 35 and adjustable screws 36. A bead 37 is attached to the tip of the reed 33 to prevent injury to the user's hand and to provide more visibility to the tip of the reed 33 when it vibrates. In operation the racket is impacted in a succession of small blows, and subsequent to each blow the extended length of the reed 33 is adjusted to obtain the greatest amplitude of vibration of the reed 33. When the maximum amplitude of the vibration reed 33 is obtained the markings 38 on the base 34 opposite the end of the reed 33 is read indicating the frequency of the vibration. This device is approximately 4.45 cm long, 1.91 cm wide, 1.016 cm deep and weighs approx. 4.26 grams.

Figure 17:
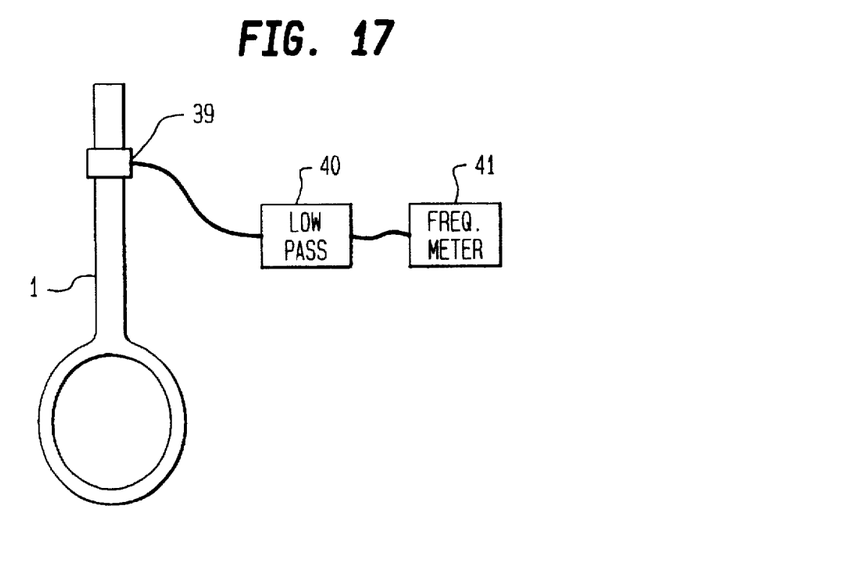
FIG. 17 shows a tennis racket having a sensor attached thereto for sending electrical vibration signals to an electrical low-pass filter and thence an electronic device which displays the frequency of vibration digitally.

FIG. 17 shows another embodiment of the invention. A sensor 39 is attached to the racket 1, which converts the mechanical vibrations of the racket into analogous electrical voltages. These electrical voltages are fed to an electrical low-pass filter 40 which reduces extraneous high frequency voltages. The filtered voltage is then fed to an electrical mini digital frequency meter 41 which displays the number of complete electrical voltage vibration cycles which occur in a given time and then displays a digital number indicating the frequency of the vibrations in cycles per second. The sensor is very small being approximately 0.635 cm deep by 0.635 cm wide and 0.953 cm long and weighs approximately 5.7 grams. The digital frequency meter is approximately 10.16 cm high, 6.9 cm wide, and 2.54 cm deep.

The sensor and electrical components are small portable and convenient to use. Suitable commercial devices are available which can be modified easily to obtain the desired results. The sensor used was a modified crystal phonograph pickup. A digital tachometer powered by a small internal nine volt battery, which is normally used to indicate the number of revolutions per minute that model airplane propellors turn by using an optical sensor was modified to be the digital frequency meter. The optical sensor was replaced with the electrical sensor, a low-pass filter was used and other adjustments were made to the circuitry. The low-pass filter is not absolutely required but it was helpful.

Figure 19:
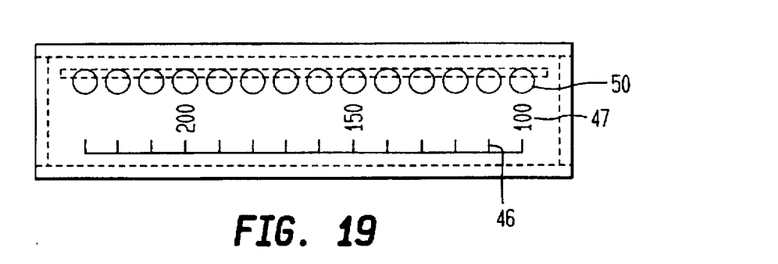
FIG. 19 shows a top view of FIG. 20.
Figure 20:
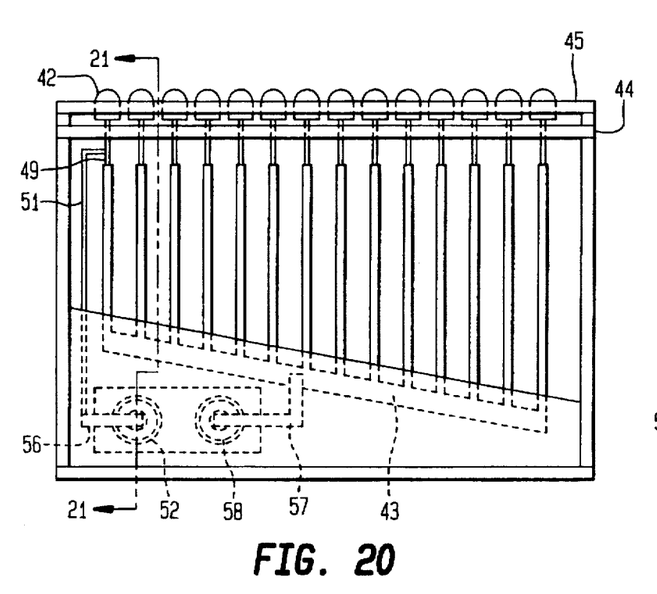
FIG. 20 shows an embodiment similar to the embodiment in FIG. 10, but utilizing light emitting diodes to indicate the vibrating reed.
Figure 21:
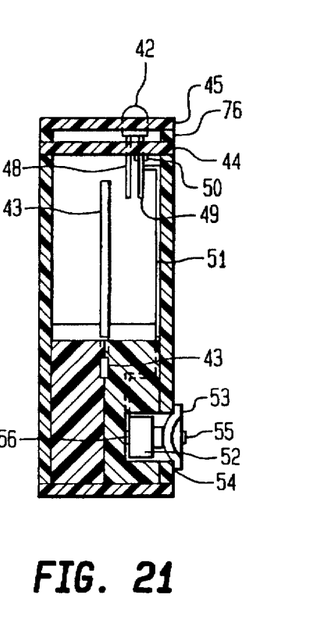
FIG. 21 shows a section 21 side view of the embodiment shown in FIG. 20.

FIGS. 19, 20 and 21 show another embodiment of the invention. The construction of the body of this embodiment is similar to the embodiment shown in FIG. 8 through FIG. 12. This embodiment utilizes a light emitting diode, LED, to indicate the vibrating reed of the reed assembly 43. The LED 42 is mounted on a top plate 44 shown in FIG. 21, and protrudes through a face plate 45. Face plate 45 is fastened to plate 44 by an appropriate adhesive and spacer 76. The top plate 44 is a plastic printed circuit board. In FIG. 19 face plate 45 has gradation markings 46 and appropriate frequency markings 47. The LED's may be of different colors. In FIG. 21 leads 48 and 49 protruding from the LED 42 are placed in holes in the circuit board 44. Lead 49 is soldered to a conducting strip 50 attached to the circuit board 44 which connects to a corresponding lead of the adjacent light emitting diode. Conductor 51 is connected to lead 49 and also connects to the tab 56 which is connected to one terminal of the battery 52, which is a 1.5 volt hearing aid type of battery. Battery 52 is connected in series with a similar battery 58 to obtain 3.0 volts by the metal cover plate 53. In FIG. 20 tab 57 is connected to a terminal of battery 58. Tab 57 is also attached to the reed assembly 43. Conducting tab 56 connects to battery 52 and also to conductor 51 which is connected to the contact lead 49 of the LED 42. In FIG. 21, lead 49 of the LED 42 is connected to the conducting strip 50 which is also connected to the corresponding leads of the other adjacent light emitting diodes. The other lead 48 of the LED 42 connects to the vibrating reed of the reed assembly 43. In FIG. 20, the reed assembly 43 is connected to tab 57 which is connected to battery 58, which is connected in series with battery 52 by means of the metal cover plate 53.

Thus, when a reed of the reed assembly 43 is activated to vibrate with sufficient amplitude by the vibrations of a racket, the appropriate LED will emit light and indicate which reed is vibrating so, and the frequency associated with the vibrating reed.

Figure 22:
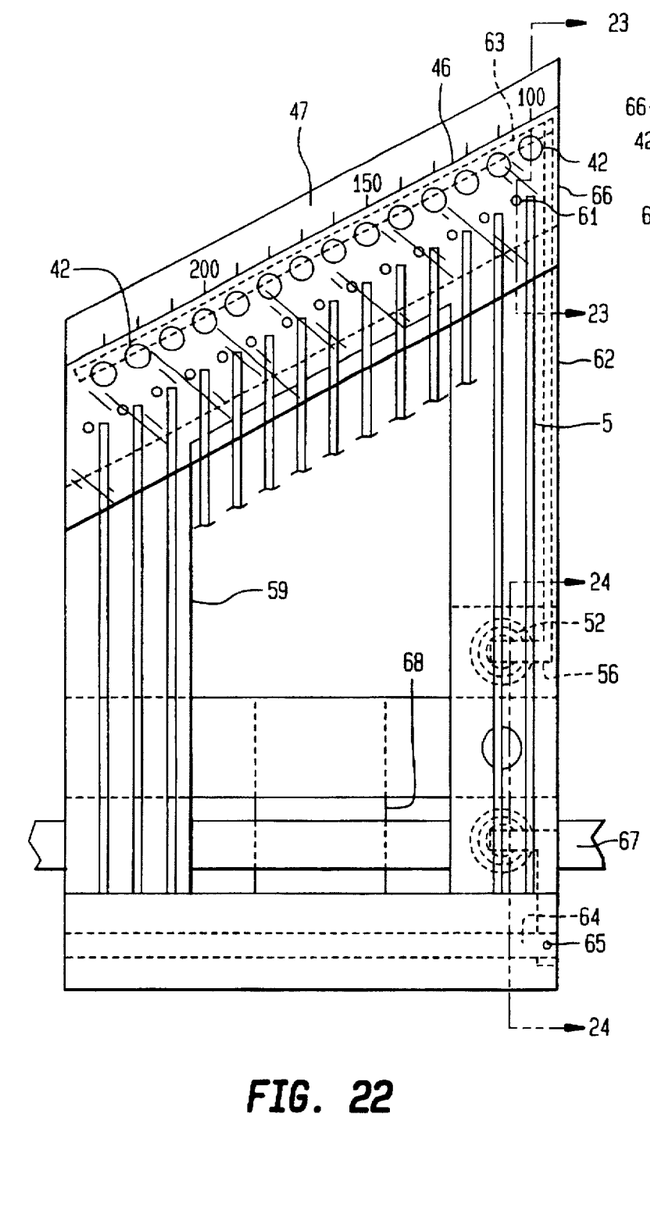
FIG. 22 shows an embodiment similar to the embodiment shown in FIG. 2, but utilizing light emitting diodes to indicate the vibrating reed.
Figure 23:
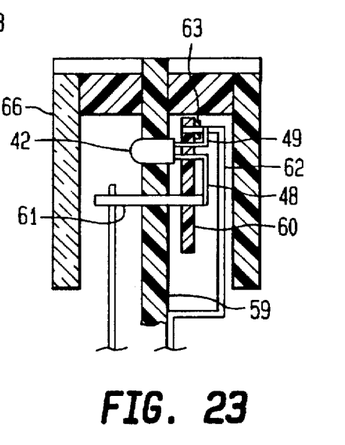
FIG. 23 shows a section 23 side view of a portion of FIG. 22.
Figure 24:
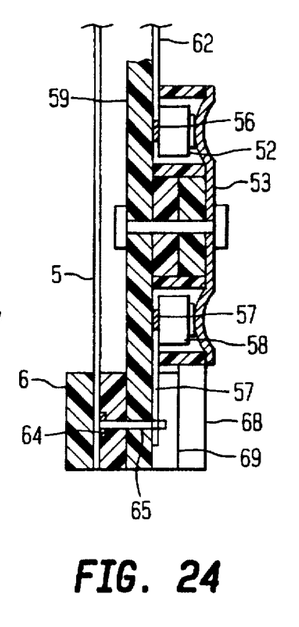
FIG. 24 shows a sectional 24 side view of a portion of FIG. 22.

FIGS. 22, 23 and 24 show another embodiment of the inventions, similar to the embodiment shown in FIG. 2. This embodiment also employs light emitting diodes, LED's, to indicate the wire reeds which are vibrating sufficiently.

The construction of the base member 6 and the wire reeds 5 are the same as is disclosed in FIG. 2. This embodiment employs a back plate 59 shown in FIGS. 22, 23 and 24 which support light emitting diodes LED's 42. FIG. 23 is a section of a portion of FIG. 22 showing LED's 42 protruding through holes in the back plate 59 and being mounted on the printed circuit board 60. The printed circuit board 60 is fastened to the back plate 59 by the contact pin 61 and appropriate adhesives. The lead 48 from the LED 42 is connected to the pin 61. Lead 49 from the LED 42 is connected to conductor 62 which is also shown in FIG. 24 connected to tab 56 which is connected to one terminal of the battery 52. Lead 49 from the LED 42 is also connected to a conducting strip 63 attached to the printed circuit board 60. The strip 63 is connected to the corresponding lead 49 of each of the adjacent LED 42. In FIG. 24 wire reeds 5 are connected to another conducting strip 64 which is electrically connected to each of the adjacent wire reeds. A conducting pin 65 is also connected to tab 57 which connects to a terminal of the battery 58 which is connected in series with battery 52 by the metal cover plate 53 to provide 3.0 volts. Thus, in FIG. 22, when a wire reed 5 vibrates with sufficient amplitude to connect with the contact pin 61, 3.0 volts is applied to the LED 42 and it emits light thereby indicating which wire reed is vibrating. Protection plate 66 shown in FIGS. 23 and 22 is transparent permitting observation of the vibrating reed and also the appropriate gradation markers 46 and the frequency markings 47. In FIG. 22 an elastic strap 67 for fastening the member 68 to the sporting implement to be measured is shown. Member 68 is cemented to the back plate 59 by means of the spacing member 69 shown in FIG. 24.

Figure 25:
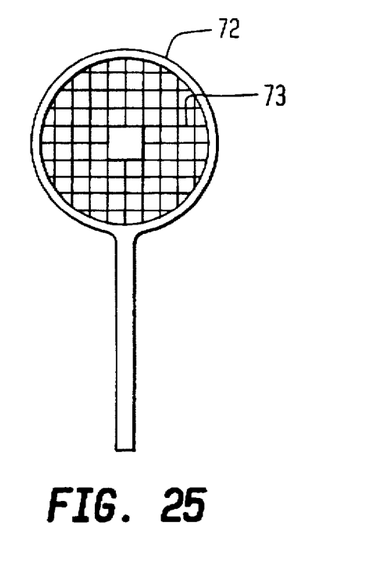
FIG. 25 shows a racket having the embodiment shown in FIG. 20 or FIG. 10 fastened to the center of the string netting along with a weight 70.
Figure 26:
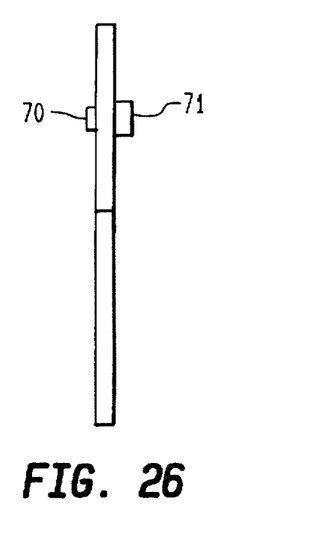
FIG. 26 is a side view of FIG. 25.

FIG. 25 and FIG. 26 show another embodiment which allows the string netting plane spring constant to be determined. The value of T is determined directly by placing a weight having a value W on the center of the string netting and measuring what the distance d the weight moves down from the position when zero weight is applied. Then the spring constant T is $$T = \frac{W}{d}$$

The frequency of vibration of the string netting plane with the weight W fastened to the center of the netting plane and a single impact is applied to the center of the string netting is given by:

$$f = c\sqrt{\frac{T}{W}}$$

Thus, if f is known

W is known, and

T is known then c can be determined, from the equation.

Thereafter, c is known f is known

W is known and T is determined, from the equation.

FIG. 25 and 26 show a supplemental weight 70 having a value $W_S$ fastened to the center of the string netting plane 73 of a racket 72 along with 71, one of the embodiments shown in FIGS. 2, 10, 13, 15, 20 or 22 and having a weight having a value $W_V$. The magnitudes of the weight 70, $W_S$ is selected so that the total weight $W_V + W_S$ of the embodiment and the supplemental weight is such as to lower the frequency of vibration of the assembly having the value $f_s$ responsive to a single impact on the center of the string netting, to be in the frequency range of the embodiment 71. The value of $W_S$, the supplemental weight may be selected to be zero, since the weight $W_V$ of the embodiment 71 may be designed to have the frequency of the vibration having the value $f_S$ be in the frequency range of the embodiment 71. Knowing the magnitude of the total weight, $W_V + W_S$ and measuring the frequency of vibration $f_S$, determines the spring constant T of the string netting plane.

The total weight $W_{V+WS}$ of the assembly is much greater than the weight of the string netting and therefore variation in the weight of the string netting from racket to racket is minimized.

Figure 27:
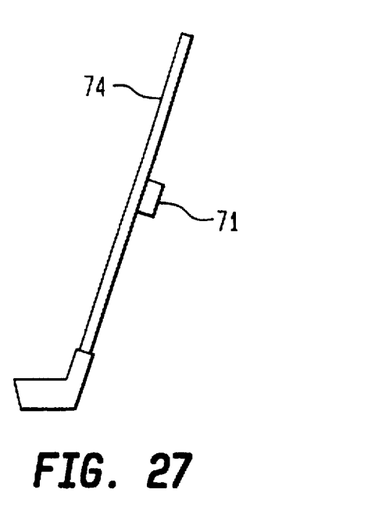
FIG. 27 shows a golf club having the embodiment of FIG. 20 or FIG. 10 attached thereto.

FIG. 27 shows 71, the embodiment of FIG. 10 or 20 attached to a golf club 74, for measurement.

Figure 28:
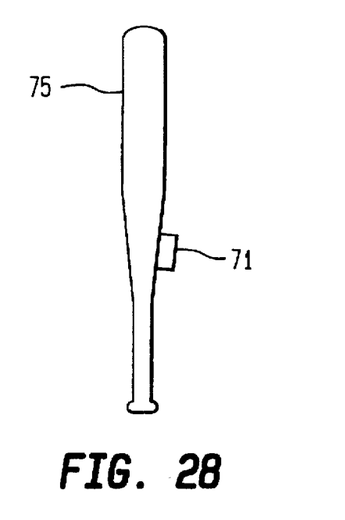
FIG. 28 shows a bat having the embodiment of FIG. 20 or FIG. 10 attached thereto.

FIG. 28 shows 71, the embodiment of FIG. 10 or 20 attached to a bat 75 for measurement.

While the above descriptions contain many specifities, these should not be construed as limitations on the scope of the invention, but rather an exemplification of the possible embodiments thereof. Many other variations are possible. Accordingly the scope of the invention should be determined not by the embodiments, but by the appended claims and their legal equivalents.

What is claimed is:

1. A combination for measuring the flexing of an implement said implement being a second body employed by a player in a sports game to have an impact with a first body, a single said impact being for a short interval of time, said implement responsive to a single impact having a mode of natural vibratory flexing in said implement, said mode of natural vibratory flexing having a natural frequency having an unknown value $f_r$ and an amplitude having a value $A_x$ at a location x on said implement; said combination comprising a measuring means measuring said implement subsequent to said impact, providing a measured value indicating said value $f_r$, said measuring means comprising at least one mechanical element having a known natural frequency of vibration; said natural frequency being substantially the same as said frequency $f_r$; a coupling means coupling said measuring means to said mode of natural vibratory flexing, the amplitude and natural frequency of vibration of said mechanical element indicating said value $f_r$ and thereby the vibratory flexing of said implement, a higher said value $f_r$ indicating said natural vibratory flexing having an amplitude having a value $A_x$ being lesser.

2. A combination as in claim 1, wherein said implement is a game racket.

3. A combination as in claim 1, wherein said implement is a bat.

4. A combination as in claim 1, wherein said implement is a club.

5. A combination as in claim 1, wherein said implement has locations not moving during said vibration, said locations being defined as nodal locations, and wherein said measuring means having coupling to said implement at a position close to one of said nodal locations, thereby providing that the said value fr is changed a minimal amount by said measuring means having said coupling.

6. A combination as in claim 1, wherein said measuring means comprises a single reed having a first end, a second end and a length between said ends; said first end having a mounting in a base member, said mounting providing for the adjustment of the extended length of said reed from said base member, said extended length being adjusted to obtain the maximum amplitude of vibration of said reed responsive to said mode of vibratory flexing of said implement being coupled to said base member; said base member having markings, said markings indicating said frequency fr, associated with said adjusted extended length of said reed.

7. A combination as in claim 6, wherein the shape of said reed in a plane perpendicular to the direction of the vibration of said reed is substantially triangular having the base portion of the triangular shape mounted in said base member.

8. A combination as in claim 1, wherein said coupling means provides for quickly coupling and quickly decoupling said measuring means to said vibratory flexing.

9. A combination as in claim 1 having a contactor means for making an electrical connection upon contact of said mechanical element with said contactor means said contactor means being positioned close to said mechanical element; said mechanical element responsive to said coupling to said mode of natural flexing having an amplitude of vibration sufficient to make contact with said contactor means for making said electrical connection; a light source; means for said light source to emit observable light indicating said mechanical element having said amplitude and said natural frequency of vibration indicating said value fr.

10. A combination as in claim 9 wherein said light source is a light emitting diode.

11. A combination as in claim 9 wherein said means for said light source includes a power source being integral with said measuring means.

12. A combination as in claim 9 wherein said mechanical element being electrically conductive.

13. A combination for measuring the flexing of an implement said implement being a second body employed in a sports game by a player to impact with a first body, a single said impact occurring at a location on said implement and being a force having a short duration of time; said implement responsive to a single said impact to have a natural mode of vibratory flexing between a first extreme position and a second extreme position a number of cycles in a period of time, said implement having a longitudinal axis, said axis being flexed into a first curve in said first position and into a second curve in said second position, said second curve being opposite to said first curve, said number being defined as a natural frequency of said natural mode of vibratory flexing of said implement having an unknown value of $f_r$ in cycles per second; at a location X on said longitudinal axis, one half the distance between said first position and said second position being defined as the amplitude of said mode of vibratory flexing at said location X having the value $A_x$; said implement having an effective mass $M_e$ at the said location of the impact, said effective mass $M_e$ being defined in the expression $$M_e = \frac{M_1(v_1 - v_1')}{v_2'},$$

$M_1$ being the mass of said first body, $v_1$ being the velocity of said mass $M_1$ just prior to said impact, $v_1'$ being the velocity of said mass $M_1$ just subsequent to said impact, $v_2$ being the velocity of the point on said implement being impacted just prior to said impact and being zero, $v_2'$ being the velocity of said point on said implement being impacted just subsequent to said impact; said combination comprising a measuring means measuring said implement subsequent to said impact, providing a measured value indicating said frequency $f_r$, said measuring means comprising at least one mechanical element having a known natural frequency of vibration, said natural frequency being substantially the same as said frequency $f_r$; coupling means coupling the said measuring means to said natural mode of vibratory flexing, the amplitude and natural frequency of said mechanical element indicating said value $f_r$ and thereby the flexing of said implement, a higher value of said frequency $f_r$ indicating a smaller said value of said mode of vibratory flexing having the value $A_x$, a greater said effective mass $M_e$, and a greater said rebound velocity $v_1'$.

14. A combination as in claim 13, wherein said measuring means comprises a plurality of spaced reeds secured in a base member, said reeds having their length and weight adjusted to provide each reed vibration be a maximum amplitude responsive to a vibration having a designated frequency and amplitude being applied to said base member; identifying means for identifying each of said reeds with said designated frequency, said designated frequency being designated in a series of values.

15. A combination as in claim 4, wherein said coupling means provides for said reeds to vibrate in a direction toward the adjacent said spaced reeds.

17

16. A combination as in claim 14 wherein said reeds have a weight attached to a portion of the reed length at a position distal to said base member.

17. A combination as in claim 16 wherein said weight being slidably attached to said portion of the reed length said position being capable of being adjusted to obtain a maximum amplitude of vibration of said reed responsive to said vibration having said designated frequency being applied to said base member.

18. A combination as in claim 14, wherein at least one reed being coated with a color, said color being repeated in said identifying means identifying said designated frequency associated with each reed.

19. A combination as in claim 14, wherein said measuring means is enclosed in a protective case having the portion of said case adjacent to the distal ends of said reeds from said base member being an optical magnifier in only one direction of the vibratory motion of said reeds, thereby providing for the amplitude of vibration of said reeds to be easily observed.

20. A vibrometer for measuring the frequency of vibration of a vibrating body having a frequency of vibration having an unknown value $f_r$, said vibrometer comprising: a plurality of mechanical elements, said elements being mounted on a supporting member, each of said mechanical elements having a natural frequency of vibration, the said natural frequencies of vibration of said plurality of mechanical elements having known predetermined different values, said values progressing in substantially uniform incremental steps from a first limit of lower value to a second limit of higher value; at least one mechanical element of said plurality of mechanical elements having a known natural frequency of vibration, said natural frequency having substantially the said value $f_r$; each of said plurality of mechanical elements having a contactor being mounted close to said mechanical element on said supporting member, said contactor being capable of making an electrical connection upon contact of said mechanical element with said contactor; said mechanical element having a natural frequency of vibration having a value of substantially the said value $f_r$, responsive to said supporting member being mechanically coupled to said vibrating body, having sufficient amplitude of vibration to contact said contactor; a plurality of light sources, said light sources being mounted on said supporting member, each of said light sources being separately connected electrically to each of said contactors; each of said light sources being capable of emitting observable light responsive to said mechanical element having sufficient amplitude of vibration to contact said contactor and indicating said value $f_r$.

21. A combination as in claim 20 wherein said light source is a light emitting diode.

22. A combination as in claim 20 wherein said means for said light source to emit observable light includes a power source integral with said vibrometer.

23. A combination for measuring the spring constant having a value of T of the string netting plane of a game racket, comprising a measuring means measuring the frequency of the vibration of said netting plane responsive to a single impact, said measuring means having a weight having a value of $W_r$; said string netting plane having said measuring means fastened to said string netting plane, responsive to a single impact having a vibration having a frequency having an unknown value of $f_s$ said measuring means responsive to said single impact indicating said value $f_s$,

18 thereby indicating said value T, said value T being determined by said value $W_r$, and said value $f_s$; said measuring means being at least one mechanical element having a known natural frequency of vibration, said natural frequency being substantially the same as said frequency $f_s$, the amplitude and said natural frequency of said mechanical element responsive to said single impact indicating said value $f_s$.

24. A combination as in claim 23 wherein said measuring means being a plurality of spaced reeds secured in a base member, said reeds having their length and weight adjusted to provide each reed vibration be a maximum amplitude responsive to a vibration having a designated frequency and amplitude being applied to said base member; identifying means for designating each of said reeds with said designated frequency, said designated frequency being designated in a series of values, at least one spaced reed having an amplitude of vibration responsive to said single impact, indicating a value substantially close to said value $f_s$.

25. A combination as in claim 23 wherein said measuring means being a single reed having a first end, a second end and a length between said ends; said first end having a mounting in a base member, said mounting providing for the adjustment of the extended length of said reed from said base member, said extended length being adjusted to obtain the maximum amplitude of vibration of said reed responsive to said vibration of said netting plane; said base member having markings, said markings indicating said value $f_s$ associated with said adjusted extended length of said reed.

26. A vibrometer for measuring the frequency of vibration of a vibrating body having a frequency of vibration having an unknown value $f_r$, said vibrometer comprising: a plurality of mechanical elements, said elements being mounted on a supporting member, each of said mechanical elements having a natural frequency of vibration, the said natural frequencies of vibration of said plurality of mechanical elements having known predetermined different values, said values progressing in substantially uniform incremental steps from a first limit of lower value to a second limit of higher value; at least one mechanical element of said plurality of mechanical elements having a known natural frequency of vibration, said natural frequency having substantially the said value $f_r$; each of said plurality of mechanical elements having a contactor being mounted close to said mechanical element on said supporting member, said contactor being capable of making an electrical connection upon contact of said mechanical element with said contactor; said mechanical element having a natural frequency of vibration having a value of substantially the said value $f_r$, responsive to said supporting member being mechanically coupled to said vibrating body, having sufficient amplitude of vibration to contact said contactor; a plurality of light sources, said light sources being mounted on said supporting member, each of said light sources having separate wiring to each of said contactors; said wiring providing pulses of electrical current upon said contact of said mechanical element with said contactor, said pulses of current not being encoded; each of said light sources emitting observable light responsive to said pulses of current being responsive to said mechanical element having sufficient amplitude of vibration to contact said contactor and thereby indicate said value $f_r$

* * * * *